UNITED STATES PATENT OFFICE 2,236,533

CELLULOSE ETHERS

Frederick C. Hahn, Upper Montclair, N. J., assignor to E. I. du Pont de Nemours & Company, Wilmington, Del., a corporation of Delaware No Drawing. Application December 21, 1937
Serial No. 180,930

11 Claims. (Cl. 260—231)

This invention relates to cellulose ethers, and more particularly to the preparation of alkali cellulose and its treatment with etherifying agents.

The usual method of preparing cellulose ethers comprises the formation of alkali cellulose (a compound, composition or intimate mixture of alkali, cellulose and water), and treatment of the same with an etherifying agent. This process has been the subject of myriad scientific investigations, and many variations of the process have been proposed by investigators.

In general, all such processes for the preparation of alkali cellulose may be divided into two classes, to wit: those in which important proportions of an inert diluent are employed, and those not employing such a material. The present invention especially appertains to the former of these classes. In order to emphasize the advance in the art herein disclosed, attention is directed to the apparently more important of the previously known processes of this class, which are:

1. The grinding of cellulose with solid caustic alkali in benzene.
2. The grinding of cellulose to a powder and the stirring of the same into a slurry of solid caustic alkali in an inert liquid, followed by the addition of the required amount of water.
3. The treatment of cellulose with an excess of caustic alkali solution and removal of the said excess by pressing, followed by the addition of a slurry of solid caustic alkali in an inert diluent, the amount of solid caustic alkali being sufficient to give the alkali cellulose the required alkali content.

A demand for cellulose ethers having clarity and color superior to that of the products prepared by previously described processes, has constantly been recognized. The preparation of good quality organic solvent soluble cellulose ethers, especially those capable of forming a film of a high degree of transparency, seems to require the uniform distribution in the starting cellulose of a comparatively small proportion of water and a comparatively large proportion of caustic alkali (more than will dissolve at normal or ordinary room temperatures in the amount of water present during etherification).

Research has indicated that expedients (previously proposed in the art) such as the treatment of cellulose with concentrated caustic alkali at high temperatures or for extended periods of time, detrimentally affect the properties of the cellulose ether produced.

This invention had for an object the provision of an improved and simplified process for the preparation of alkali cellulose of a high degree of uniformity and other properties rendering the same suitable for use as an intermediate for the preparation of high quality cellulose ethers. Other objects were the preparation of alkali cellulose while avoiding those methods which, in the prior art, have been found to cause injury to the starting cellulose and to affect deleteriously the quality of the final product, e. g., subjecting the starting cellulose to injury by oxidation in the presence of caustic alkali, steeping (with attendant pressing and shredding) the starting cellulose in caustic alkali solution, grinding the starting cellulose in the presence of caustic alkali or otherwise, subjecting the starting cellulose to contact with concentrated caustic alkali solutions for extended periods of time, and subjecting the starting cellulose to contact with concentrated caustic at high temperatures. A still further object was to provide an improved method of preparing alkali cellulose of low water and high caustic alkali content capable of etherification to give improved organic solvent soluble cellulose ethers having an exceptionally high degree of uniformity and especially suitable for the production of films of high transparency. A general advance in the art and other objects which will appear hereinafter are also contemplated.

It has now been found that an alkali cellulose, capable of giving an exceptionally high quality cellulose ether by treatment with an etherifying agent, is obtainable by wetting cellulose with an inert diluent and thereafter treating the same with a strong caustic alkali solution. More specifically, it has been found that a superior alkali cellulose may be produced by stirring granulated cellulose into an emulsion or dispersion of strong caustic alkali solution in benzene (the benzene being the outside phase so that the cellulose is wet with the benzene before contact with the caustic alkali solution), or by mixing cellulose wet with benzene with strong caustic alkali solution.

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

Example I

Air dried granulated pulp board (75 parts) and benzene (396 parts) were introduced into an autoclave. While agitating the mixture, the temperature was raised to about 70° C. To the resulting cellulose-benzene mixture there was added gradually at 70–80° C. over a period of one hour a concentrated solution of caustic alkali made by dissolving 175 parts of sodium hydroxide in 83 parts of water. During this addition the mixture was continuously agitated and the temperature was maintained at 70° C. to avoid separation of caustic from the solution. To the resulting suspension of alkali cellulose in benzene there was added 243 parts of ethyl chloride and the mixture heated with agitation to about 150° C. The agitation of the mixture was continued at this temperature for about 7 hours. The ethyl cellulose thus prepared was isolated in the manner well known in the art. The isolated product was a white granular solid, and when dissolved in 80–20 toluene-ethanol or when cast from such a solution in the form of a film, was of a high degree of clarity and free from color and insoluble fibers. It could be used directly for safety glass interlayers and transparent plastics, it being more suitable for this purpose than cellulose ethers prepared by previously known methods.

Example II

Caustic soda (177 parts), water (83.5 parts) and benzene (396 parts) were charged into an autoclave. The mixture was heated to 65° C. and agitated until all the caustic alkali dissolved in the water. As a result there was obtained a two-layer system consisting of a very concentrated sodium hydroxide solution under benzene. Agitation was discontinued and 75 parts of granulated wood pulp board introduced. Agitation was resumed and the resultant mass was heated at 65°–100° C. for 2 hours. The resulting suspension of alkali cellulose in benzene was treated with 243 parts of ethyl chloride. This mixture while being agitated was heated to 150° C. and the agitation at that temperature continued for 6 hours. The resulting ethyl cellulose was isolated from the reaction mixture and purified by known methods. The ethyl cellulose thus produced when brought into the form of a film had such high transparency and freedom from color that it could be used directly for safety glass interlayers. A similar product was obtained by a procedure identical with the above, except that the two-layer system was agitated while the granulated pulp board was being introduced.

Example III

Seventy-five (75) parts of cellulose pulp chips (or granules) were air dried and introduced into an autoclave with 396 parts of benzene. The mixture was heated to 70° C. with agitation. The agitation was stopped, and while maintaining the temperature of 70° C., 175 parts of caustic soda dissolved in 83 parts of water were added. Agitation was resumed for a period of 1 hour to obtain an intimate premixture of the caustic soda with the cellulose. There resulted a suspension of alkali cellulose in benzene to which was added 243 parts of ethyl chloride. The temperature was raised to 150° C. with agitation. Stirring at this temperature was continued for 7 hours. The ethyl cellulose thus prepared was isolated from the by products of the reaction by known methods, for example, that of United States Patent 1,990,904. A similar product was obtained by a procedure identical with the above except that the two-layer system was agitated while the granulated pulp board was being introduced. The ethyl cellulose thus obtained was of excellent quality.

Example IV

Water, benzene and sodium hydroxide in the ratio of 83.5, 396 and 177 parts, respectively, were charged into an autoclave, agitation started, and the temperature raised to 65° C. With the agitation continuing, there was added 75 parts of granulated wood pulp after all the sodium hydroxide had dissolved in the water. Subsequent agitation for 2 hours at 65°–100° C. resulted in a suspension of alkali cellulose in benzene. To this there was added 243 parts of ethyl chloride and the resulting mixture was heated to 150° C. with agitation. The agitation was continued while maintaining the temperature for 6 hours. There was obtained an excellent quality ethyl cellulose after isolation from the reaction mixture in the manner described in the United States Patent Application Serial No. 92,606, filed July 25, 1936.

Example V

Two hundred and forty (240) parts of solid caustic soda, 140 parts of water, 560 parts of benzene, and one part of ethyl cellulose were mixed and heated at about 70° C. until the solid caustic had dissolved in the water and the resulting solution had been emulsified with the benzene. The resulting emulsion was charged into an autoclave and 100 parts of granulated high alpha cellulose wood pulp board (high alpha wood pulp board cut into chips about ⅛ x 1/16 x 1/16″) was added to the emulsion while agitating. The mixture was agitated at 70°–90° C. until the inert diluent was substantially free from caustic solution, i. e., clear. To effect this result from 15 to 30 minutes mixing is ordinarily sufficient. Two hundred and eighty (280) parts of ethyl chloride were then added and the resulting mixture was agitated and heated for eight to ten hours at 130°–150° C. The reaction mixture consisted of a solution of ethyl cellulose in benzene, alcohol and diethyl ether (the last two were by-products), in which were suspended crystals of salt and excess caustic alkali solution. This mixture was treated with water and agitated to dissolve the salt and form an emulsion. An emulsification assistant such as Turkey red oil may be used with advantage in the formation of this emulsion. The resulting emulsion was steam distilled while agitating to remove the volatile solvents. After the volatile solvents were removed, the crude ethyl cellulose remained as a finely divided solid suspended in the alkaline salt residual liquor. The ethyl cellulose was filtered; washed free of most of the alkali and salt by several treatments with hot or boiling water; treated with dilute acid (sulfuric, hydrochloric, nitric, acetic, etc.) to neutralize the remaining alkali; washed with water to remove most of the acid; treated with very dilute solution of alkali or ammonia (ammonia is especially suitable) to neutralize the remaining trace of acid; washed to neutrality with water; and then dried. The product dissolved in toluene-alcohol and many other organic solvents. The solutions were characterized by a high degree of clarity and the substantial absence of color.

Example VI

Two hundred and thirty-six (236) parts of solid caustic soda, 119 parts of water, 540 parts of toluene, and 1 part of benzyl cellulose were mixed and heated at about 70° C. for 1 hour. During this period the caustic dissolved in water and formed an emulsion with the toluene. To this dispersion was added 100 parts of high alpha cellulose wood pulp in the form of granulated wood pulp and the mixture was agitated for about 1 hour, the temperature being maintained at 70°–90° C. The resulting alkali cellulose was treated with 550 parts of benzyl chloride, the mixture was agitated, and the temperature was gradually raised to 110° C. and maintained at this temperature for about 10 hours. The resulting benzyl cellulose was isolated and purified in the known manner. It gave solutions in organic solvents (for example, toluene-alcohol) of a high degree of clarity and low color, and was particularly suited for the manufacture of high quality plastics, films, lacquers, etc.

Example VII

One hundred and seventy-four (174) parts of flake caustic alkali were dissolved in 352 parts of 50% caustic alkali solution at about 70° C. This solution was added to 792 parts of benzene in an autoclave, whereupon two layers were formed with the benzene constituting the upper layer. One hundred and forty (140) parts (dry weight basis) of granulated high alpha cellulose wood pulp board containing 0.5% of sodium isobutyrate were charged into the autoclave. Agitation was started and continued at 70°–90° C. until the inert diluent was substantially free from caustic solution, i. e., clear, and the caustic solution was uniformly distributed throughout the cellulose. To effect this result, from 15 minutes to 1 hour is ordinarily sufficient. Four hundred and thirty-four (434) parts of ethyl chloride were then added, and the resulting mixture was agitated and heated for 6 to 10 hours at 135°–165° C. The reaction mixture consisted of a solution of ethyl cellulose in benzene, alcohol and diethyl ether (the last two were by-products), in which were suspended fine crystals of salt and excess caustic alkali solution. If the mixture is to be filtered, water is added to dissolve the salt, but ordinarily this treatment is omitted. The mixture was run into water at 70° C. to 90° C. to remove the volatile solvents, to precipitate the ethyl cellulose, and to dissolve the inorganic materials present. After the volatile solvents were removed, the crude ethyl cellulose remained as a finely divided solid suspended in the alkaline salt residual liquor. The ethyl cellulose was filtered; was washed free of most of the alkali and salt by several treatments with water; was treated with dilute acid (sulfuric, hydrochloric, nitric, acetic, etc.) to neutralize the remaining alkali and to remove insoluble inorganic materials; was washed with water to remove most of the acid; was treated with a dilute solution of alkali or ammonia to neutralize the remaining trace of acid; was washed with water, and finally dried. The product dissolved in toluene-alcohol and many other organic solvents. The solutions were characterized by a high degree of clarity and the substantial absence of color.

Example VIII

Two hundred and thirty-six (236) parts solid caustic soda, 119 parts of water, 560 parts of benzene, and 1 part of benzyl ethyl cellulose were mixed at about 70° C. to produce an emulsion of caustic soda solution in benzene. To the emulsion was then added 100 parts of granulated wood pulp board and the mixture agitated for 1 hour at 70°–90° C. One hundred and eighty (180) parts of ethyl chloride and 190 parts of benzyl chloride were added. The resulting mixture was agitated for 4 hours at 120° C., the temperature was gradually raised over a period of 1 hour to 135° C., and then maintained at this point for 6 hours. The resulting ethyl benzyl cellulose, when purified by the known procedures, produced smooth solutions of good clarity and freedom from usual fibers, and gave films of excellent toughness and water resistance.

Example IX

Two hundred and thirty-six (236) parts of solid caustic soda, 119 parts of water, 560 parts of benzene, and 1 part of ethyl cellulose were mixed thoroughly at 70° C. To the resulting emulsion was added 100 parts of granulated pulp board, and the mixture was agitated at 70°–90° C. for 1 hour. Twenty-seven (27) parts of ethylene oxide and 280 parts of ethyl chloride were added. The mixture was agitated and heated gradually to 150° C. over a period of 3 to 4 hours, and maintained at this temperature for about 7 hours. The resulting mixed cellulose ether was very uniform, had excellent solubility in a number of solvents, e. g., alcohol, acetone, toluene-alcohol, benzene-alcohol, and gave films of good clarity and excellent toughness. Ethylene chlorohydrin may be used in place of ethylene oxide to produce similar products.

Example X

Four hundred (400) parts of solid caustic soda, 270 parts of water, 550 parts of benzene, and one part of ethyl cellulose were agitated in an autoclave for about one hour at 65°–75° C. To the resulting dispersion of caustic solution in benzene was added 100 parts of granulated pulp board. This mixture was agitated for about 1 hour at 70°–90° C. Four hundred (400) parts of ethyl chloride were added, and the mixture was agitated and heated for 8 hours at 150° C. The resulting ethyl cellulose gave films and plastics of especial toughness.

Example XI

Two hundred and thirty-six (236) parts of solid caustic soda, 119 parts of water, and 566 parts of benzene were mixed and heated to 70° C. over a period of about one-half hour, forming an emulsion of a very concentrated caustic alkali solution in benzene. One hundred (100) parts of granulated pulp board containing about 1% (based on the cellulose) of "Alkanol-M" were violently mixed with the foregoing emulsion for about 1 hour at a temperature of 70°–90° C. Two hundred and eighty (280) parts of ethyl chloride were added, and the resulting mixture, while continually agitating, was heated gradually to 150° C. over a period of two hours, and maintained at this temperature for 5 hours. The resulting ethyl cellulose was isolated from the reaction mixture and purified in the known manner. The product dissolved in toluene-alcohol and a number of other solvents. The resulting solutions had a high degree of clarity, and were practically colorless. Plastics sheeting manufactured from this material was characterized by a high degree of clarity and substantial freedom from color.

This procedure may be varied by adding one part of sodium isobutyrate to the 119 parts of water in place of adding "Alkanol-M" to the cellulose. Alkali stable wetting agents in general may be employed.

Example XII

Two hundred and thirty-eight (238) parts of 50% caustic soda solution, 117 parts of solid caustic soda, 560 parts of benzene, and 1 part of ethyl cellulose were violently stirred and heated to 70° C. The solid caustic soda dissolved completely, and the resulting very highly concentrated caustic alkali solution was emulsified with the benzene. One hundred (100) parts of granulated pulp board pretreated with 2% "Alkanol-M" and dried, were introduced into the foregoing emulsion while agitating the mass, and mixing was continued for about one-half hour at 70°–90° C. Two hundred and eighty (280) parts of ethyl chloride were added, and the resulting mixture, continuously agitated, was heated to 150° C. over a period of about 2 hours and maintained at this temperature for from 4 to 5 hours. The resulting ethyl cellulose, after isolation and purification in the known manner, possessed the very high qualities of the products of the previous examples.

Benzene is the preferred inert diluent because it has a very desirable combination of physical and chemical properties. In general any volatile organic liquid immiscible with water or the aqueous caustic alkali used in the etherification, inert (inactive) toward cellulose and the other ingredients of the reaction mixture under etherifying conditions and showing good stability in the presence of caustic alkali, may be employed. Compounds not soluble in water to an extent appreciably greater than 1% at 20° C., are considered immiscible with water. It is preferable that the diluent be of lower specific gravity than the caustic soda solution. In addition to benzene, toluene, low boiling gasoline, xylene, dibutyl ether, di-isobutyl ether, dibenzyl ether, and the like, special mention may be made of such other organic liquid diluents as di-ethyl ether, di-propyl ether and di-isopropyl ether.

Preferably the benzene is used in sufficient quantity to thoroughly wet the cellulose and to submerge it substantially. This is most readily accomplished, and this procedure shows to the greatest advantage when the cellulose is used in the form of a relatively dense product such as granulated pulp board. Cellulose in the form of comparatively dense chips or granules is preferred in carrying out the invention. It has been found that definite advantages accrue from the use of granulated cellulose, for example, granulated pulp board. The apparent bulk density, size, and compactness of the individual granules are important characteristics in the selection of a cellulosic raw material. Granules obtained by cutting commercial pulp board into chips are especially suitable because this type of cellulose, due to its high density, is more or less submerged in the diluent and reactants during the formation of the alkali cellulose and its etherification. In the production of cellulose ethers of the highest quality, it is desirable that air (probably because of its oxygen content) be substantially absent from the reaction vessel. Although most of the air is driven out of the reaction vessel by the vapors of the benzene, the aforementioned submergence of the cellulose granules contributes materially in preventing the contact of the same with air. In this connection, the possibility of oxidation of the alkali cellulose prior to etherification may be entirely eliminated by evacuating the air from the reaction vessel and replacing it with a substance having no deleterious effect, such as nitrogen. Cellulose granules of the type described above, and their preparation, are disclosed in detail in United States Patent 2,067,946 of January 19, 1937, to Picton.

The type of cellulose suitable for use in this invention is not limited to the cellulose chips above described or even wood pulps in general, but includes cellulose from other sources, such as cotton hulls, bagasse, ramie and flax. Regenerated cellulose from viscose, cuprammonium and other solutions may be utilized. Cellulose pretreated or modified in various ways, for example, cellulose pretreated with acids such as formic, acetic, nitric, sulfuric, or oxidizing agents and low substituted cellulose derivatives, may be used as the starting material. Low viscosity ethyl cellulose may be prepared directly from low viscosity cellulose.

The moisture content of the cellulose prior to contact with the benzene may vary somewhat, but the fiber should not contain enough water so that a film of water forms on the surface of the fibers, or so that the pulp feels damp to the touch, that is, the fiber should not contain more than about 20% moisture. The cellulose should not be sensibly wet with water or caustic soda or other aqueous solution when contacted with the benzene.

Sodium hydroxide is the preferred alkali, although any alkali metal hydroxide, for example, caustic potash, or mixtures of caustic alkalies, for example caustic potash and caustic soda, may be satisfactorily used. For convenience in describing the invention, the sodium hydroxide which has great economic advantages is usually referred to.

The inventive feature of wetting the cellulose with benzene before contacting it with the caustic soda solution is applicable to any concentration of caustic alkali solution which may be used in the preparation of alkali cellulose or in the etherification of cellulose. The process of the invention shows outstanding advantages when solutions of 50% or greater concentrations are used. The improvement of the quality of the final cellulose ether product is especially significant when the concentration of the caustic is greater than 56%, i. e., when the solution contains more caustic soda than will dissolve at normal room temperature in the water present. Important advantages and superior results are obtained when using concentrations between about 50% and about 56%, for example, 52% and 54%.

As will be clear from the examples, the wetting of the cellulose with the benzene may take place in various ways. Special mention may be made of the procedures in which:

1. The cellulose is run into a vessel containing caustic soda having a supernatant layer of benzene;

2. The cellulose is run into a vessel containing an emulsion of caustic soda in benzene;

3. The cellulose is run into a vessel containing benzene, and after wetting of the cellulose by the benzene, caustic soda is run into the vessel; and 4. The benzene is run into a vessel containing cellulose, and after thorough wetting of the cellulose, caustic soda solution is run into the resultant.

The additions in any of the above procedures may be carried out in the presence or absence of agitation, such as stirring.

Cellulose ethers of various types may be prepared according to this invention by the selection of appropriate etherifying agents. The alkali cellulose made by the processes described herein is exceptionally suitable, probably by reason of its unusually high degree of uniformity as an intermediate for the preparation of such specific cellulose ethers as alkyl, aralkyl, aryl, alkoxyalkyl, and the like. The etherifying agents suitable for preparing any desired cellulose ether are well known and need not be mentioned at length, although specific mention may be made of such reagents as benzyl chloride, ethyl chloride, sodium chloracetate, ethylene chlorhydrin, ethylene oxide, methyl chloride, ethoxy ethyl chloride, and their homologues and analogues. Preferably an etherifying agent is selected which is substantially non-reactive to cellulose in the presence of alkali at 70° C. Etherification at room temperature is, however, within the purview of the invention.

In some of the examples, the caustic soda is dispersed or emulsified in the benzene, the diluent being always the outside phase. Although fine dispersions of these two immiscible liquids may be obtained simply by efficient mixing, the use of an emulsifying or dispersing assistant facilitates the production of an emulsion or dispersion. Emulsifying assistants in general may be employed, but it is preferable to use a substance which is of the same general character as the desired product, or if not of that character, one which will not involve difficulty in subsequent purification of the product. The preferred emulsifying assistants include ethyl cellulose, benzyl cellulose, butyl cellulose, glycol cellulose, cellulose glycolic acid, methyl cellulose, and the like. Special mention may be made of the alkali metal salts and long chain aliphatic acids, such as sodium oleate and the like.

In some of the examples a wetting agent, i. e., a substance inert to the reactants, soluble in the reaction mixture, and capable of: (1) effecting the equalization of the rate of absorption by the different cellulose fibers, and (2) substantial reduction of the interfacial tension between the etherifying agent and the alkali cellulose, is present. Incorporation of such substances in the cellulose (especially when dense chips are being used) prior to its mixture with the other ingredients of the reaction mass, facilitates a more even distribution of the alkali in the cellulose and gives superior results with a minimum amount of wetting agent.

Wetting agents stable (i. e., functioning as such) in alkali may in general be employed to facilitate the wetting of the cellulose by the alkali solution or emulsion thereof. The "Alkanol-M" mentioned above is a preferred reagent because it is soluble in the alkali solution. It consists of the sodium salts of acids prepared by the oxidation of the mixture of oxygenated carbon (organic) compounds obtained by the catalytic hydrogenation of carbon oxides under elevated temperatures and pressures. These acids may be obtained by processes such as those described in United States Patent 1,856,263. Salts of varying characteristics are obtained from different fractions of the acids thus obtained, and are representative of alkali stable wetting agents in general. The salts of acids of four to eight carbon atoms are considered to be particularly useful. Other substances having suitable alkali stability include sodium isobutyrate and sodium lauryl sulfate. Sodium and other alkali metal salts of sulfonated castor oils of the Turkey red oil type, of alkylated naphthalene sulfonic acids, of sulfonated petroleum, of sulfonated fish oils, etc., may be used, although somewhat less satisfactorily.

Procedures in which the wetting agent is added with the etherifying agent may be used. In such cases substances soluble in the etherifying agent, for example, oleic and coconut oil acids, which dissolve in benzyl chloride, are advantageously used.

As indicated, the wetting agent may be added at various stages in and by various means to the reaction mass. It may be distributed in the cellulose prior to the addition of the cellulose to the reaction vessel, or may in some instances be dissolved in the etherification agent prior to its addition to the reaction vessel. Other satisfactory modes of the addition include:

1. Addition separately
2. Addition as a solution in the water
3. Addition with the alkali
4. Addition in the benzene, and
5. Introduction as a solid or solution prior to the addition of the last added reactant. (As a rule the etherifying agent is the last added reactant. With proper equipment it would be possible to add the cellulose and caustic alkali after addition of ethyl chloride, but this is not ordinarily done.)

In this manner the formation of the alkali cellulose and subsequent etherification are facilitated. Benefit is also obtained by incorporation of the wetting agent in the alkali cellulose prior to the addition of the etherifying agent. In the preferred embodiment of the invention, the wetting agent is used in pretreating the cellulose. The use of a wetting agent quite definitely expedites the process. For example, sodium isobutyrate in the proportion of from 5 to 10 parts per 100 parts of cellulose reduces the time required to complete etherification, i. e., to obtain a product having the desired solubility in a toluene-ethyl alcohol mixture (for example, 80–20), by 25% or more (for comparative purposes the process of Example II). In processes such as those set out in Examples I and II where no wetting agent was present, the etherification is continued until the desired solubility is obtained, this requiring (in instances) from 6 to 10 hours.

The preparation of the alkali cellulose may be conducted under a wide variety of conditions as regards time and temperature. As will be clear to those skilled in the art, the conditions to be used vary with the particular cellulose raw material and other reagents used in the process.

The temperature at which the alkali and cellulose are mixed should be as low as convenient, consistent with the requirement that it be high enough to keep the caustic alkali in solution in the water present.

The ingredients should be mixed for a period of time sufficient to give uniform distribution of the caustic over the cellulose. This is governed by the speed and efficiency of mixing, the size of the batch, and ordinarily takes 15 minutes or more.

The proportions of alkali, cellulose and water may be varied, depending on the product to be prepared. For organic solvent-soluble ethyl cellulose a preferred ratio is cellulose 100 parts, water 80 to 150 parts and sodium hydroxide about one to two times the amount of water.

The etherification of the alkali cellulose may likewise be conducted under a wide variety of time and temperature conditions. The conditions used vary with the particular cellulose ether being prepared and the particular etherifying agent being used. In the preparation of ethyl cellulose with ethyl chloride reaction temperatures may vary from about 90° to about 170° C., and preferably are in the neighborhood of 150° C., reaction being continued until it is complete under the existing conditions.

As many apparently widely different embodiments of this invention may be made without departing from the spirit and scope thereof, it is to be understood that I do not limit myself to the specific embodiments thereof except as defined in the appended claims.

I claim:

1. The process which comprises dissolving 174 parts of caustic soda in 352 parts of 50% caustic soda solution at 70° C., adding the resultant to 792 parts of benzene to form a two layer system, adding 140 parts of granulated high alpha cellulose wood pulp board containing 0.5% of sodium isobutyrate, and agitating at 70°–90° C. until the benzene is clear and the caustic soda solution uniformly distributed throughout the cellulose.

2. In a process of preparing alkali cellulose, in which granulated high alpha cellulose wood pulp board containing sodium isobutyrate as a wetting agent is used as the raw material, in which there is no attrition capable of producing shortening of substantial quantities of the cellulose fibers and in which the alkali cellulose is formed by treating with caustic alkali solution, the steps of wetting the cellulose fiber with toluene and thereafter treating the wetted cellulose with an aqueous solution of sodium hydroxide containing about one to two times as much sodium hydroxide as water.

3. The process which comprises dissolving caustic soda in water, adding the resultant to benzene to form a two-layer system, adding granulated high alpha cellulose and agitating until the benzene is clear and the caustic soda solution uniformly distributed throughout the cellulose, the amount of caustic soda being about two times the amount of water.

4. In the process of preparing alkali cellulose by treating cellulose in the presence of inert diluent with caustic alkali dissolved in water, the improvement which comprises wetting dry cellulose with inert diluent and treating the resultant inert diluent-wet cellulose with aqueous caustic alkali solution of greater than 50% strength, all of the caustic alkali used in the treatment being dissolved before and at the time when the solution is contacted with the cellulose.

5. In the process of preparing alkali cellulose by treating cellulose in the presence of benzene with caustic soda dissolved in water, the improvement which comprises wetting dry cellulose with benzene and treating the resultant benzene-wet cellulose with aqueous caustic soda solution of greater than 50% strength, all of the caustic soda used in the treatment being dissolved before and at the time when the solution is contacted with the cellulose.

6. In the process of preparing cellulose ether from alkali cellulose in the presence of inert diluent, the improvement which comprises wetting dry cellulose with inert diluent, treating the resultant inert diluent-wet cellulose with aqueous caustic alkali solution of greater than 50% strength, all of the caustic alkali used in the treatment being dissolved before and at the time when the solution is contacted with the cellulose fiber which is wet with inert diluent, and thereafter treating the resulting mixture with etherifying agent at etherifying temperature.

7. In the process of preparing ethyl cellulose from alkali cellulose in the presence of benzene, the improvement which comprises wetting dry cellulose with benzene, treating the resultant benzene-wet cellulose with aqueous caustic soda solution of greater than 50% strength, all of the caustic soda used in the treatment being dissolved before and at the time when the solution is contacted with cellulose fiber which is wet with benzene, and thereafter treating the resulting mixture with ethylating agent at ethylating temperature.

8. In the process of preparing alkali cellulose by treating cellulose in the presence of inert diluent with caustic alkali dissolved in water, the improvement which comprises wetting dry cellulose with inert diluent, contacting the diluent-wet cellulose with aqueous caustic alkali solution of greater than 50% strength, all of the caustic alkali used in the treatment being dissolved before and at the time when the solution is contacted with the cellulose, and agitating the resulting mixture to obtain a uniform dispersion.

9. In the process of preparing alkali cellulose by treating cellulose in the presence of benzene with caustic alkali dissolved in water, the improvement which comprises wetting dry cellulose with benzene, contacting the benzene-wet cellulose with aqueous caustic soda solution containing one to two times as much caustic soda as water, all of the caustic soda used in the treatment being dissolved before and at the time when the solution is contacted with the cellulose, and agitating the resulting mixture to obtain a uniform dispersion.

10. In the process of preparing alkali cellulose by treating cellulose in the presence of benzene with caustic alkali dissolved in water, the improvement which comprises wetting dry granulated cellulose with benzene, contacting the benzene-wet cellulose with aqueous caustic soda solution of greater than 50% strength, all of the caustic soda used in the treatment being dissolved before and at the time when the solution is contacted with the cellulose, whereby to provide a reaction mixture free from solid alkali, and agitating the resulting mixture to obtain a uniform dispersion.

11. In the preparation of cellulose ethers, the steps of wetting the dry cellulose with benzene and thereafter treating the resultant benzene wet cellulose with sodium hydroxide and water, all of the sodium hydroxide being dissolved in the water before the same is contacted with the cellulose and the sodium hydroxide solution being of greater than 50% strength.

FREDERICK C. HAHN.